United States Patent
Nakamura et al.

(10) Patent No.: US 11,894,555 B2
(45) Date of Patent: Feb. 6, 2024

(54) POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventors: Takuma Nakamura, Ehime (JP); Haruki Kaneda, Ehime (JP); Yuki Koshika, Ehime (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 570 days.

(21) Appl. No.: 17/264,941

(22) PCT Filed: Jul. 31, 2019

(86) PCT No.: PCT/JP2019/030036
§ 371 (c)(1),
(2) Date: Feb. 1, 2021

(87) PCT Pub. No.: WO2020/027204
PCT Pub. Date: Feb. 6, 2020

(65) Prior Publication Data
US 2021/0313570 A1  Oct. 7, 2021

(30) Foreign Application Priority Data
Aug. 3, 2018 (JP) .................... 2018-147170
Dec. 14, 2018 (JP) .................... 2018-234866

(51) Int. Cl.
*H01M 4/505* (2010.01)
*H01M 4/04* (2006.01)
(Continued)

(52) U.S. Cl.
CPC ......... *H01M 4/505* (2013.01); *H01M 4/0471* (2013.01); *H01M 4/525* (2013.01); *H01M 10/0525* (2013.01); *H01M 2004/028* (2013.01)

(58) Field of Classification Search
CPC .... H01M 4/505; H01M 4/0471; H01M 4/525; H01M 10/0525; H01M 2004/028
See application file for complete search history.

(56) References Cited

U.S. PATENT DOCUMENTS 8,986,571 B2  3/2015  Watanabe et al.
9,698,420 B2  7/2017  Ishizaki et al.
(Continued)

FOREIGN PATENT DOCUMENTS

EP  2557068  2/2013
JP  2002-151071  5/2002
(Continued)

OTHER PUBLICATIONS

International Search Report dated Nov. 5, 2019 with respect to No. PCT/JP2019/030036.
(Continued)

*Primary Examiner* — Matthew J Merkling
(74) *Attorney, Agent, or Firm* — IPUSA, PLLC

(57) ABSTRACT

A positive electrode active material for a lithium ion secondary battery containing lithium nickel manganese complex oxide particles, wherein the lithium nickel manganese complex oxide particles are composed of secondary particles in which primary particles of a lithium nickel manganese complex oxide represented by a general formula $Li_dNi_{1-a-b-c}Mn_aM_bZr_cO_{2+\alpha}$ (where M is at least one element selected from Co, W, Mo, Mg, Ca, Al, Ti, Cr, and Ta, and is $0.05 \leq a < 0.60$, $0 \leq b < 0.60$, $0.00003 \leq c \leq 0.03$, $0.05 \leq a+b+c \leq 0.60$, $0.95 \leq d \leq 1.20$, and $-0.2 \leq \alpha \leq 0.2$), wherein at least a portion of zirconium is dispersed in the primary particle, and (Continued)

wherein an amount of a positive active material for a lithium ion secondary battery in which an amount of excessive lithium determined by a neutralization titration method is 0.02 mass % or more and 0.09 mass % or less.

10 Claims, 2 Drawing Sheets

(51) Int. Cl.
    *H01M 4/525*     (2010.01)
    *H01M 10/0525*     (2010.01)
    *H01M 4/02*     (2006.01)

(56) References Cited

U.S. PATENT DOCUMENTS

| | | | |
|---|---|---|---|
| 9,742,002 | B2 | 8/2017 | Shimokita et al. |
| 10,483,539 | B2 | 11/2019 | Inoue et al. |
| 2016/0043383 | A1* | 2/2016 | Hamada ............... H01M 4/049 252/182.1 |
| 2016/0099460 | A1* | 4/2016 | Toyama ............... H01M 4/525 429/223 |
| 2017/0117550 | A1* | 4/2017 | Ota ...................... H01M 4/1391 |
| 2017/0133672 | A1 | 5/2017 | Song et al. |
| 2017/0200942 | A1* | 7/2017 | Ota ........................ B01J 13/04 |
| 2017/0207454 | A1* | 7/2017 | Ota .................. H01M 10/0525 |
| 2017/0271655 | A1* | 9/2017 | Oh ...................... H01M 4/0471 |
| 2018/0261873 | A1 | 9/2018 | Yamaji et al. |
| 2019/0051929 | A1* | 2/2019 | Okada ............... H01M 10/0525 |
| 2019/0165360 | A1 | 5/2019 | Saruwatari et al. |
| 2020/0388841 | A1 | 12/2020 | Kaneda et al. |

FOREIGN PATENT DOCUMENTS

| | | |
|---|---|---|
| JP | 2005-251716 | 9/2005 |
| JP | 2011-108554 | 6/2011 |
| JP | 2011-113885 | 6/2011 |
| JP | 2012-017253 | 1/2012 |
| JP | 2012-253009 | 12/2012 |
| JP | 2013-239434 | 11/2013 |
| JP | 2014-216061 | 11/2014 |
| JP | 2016-033906 | 3/2016 |
| WO | 2014/061653 | 4/2014 |
| WO | 2016/013674 | 1/2016 |
| WO | 2017/090378 | 6/2017 |
| WO | 2017/199891 | 11/2017 |
| WO | 2018/123951 | 7/2018 |

OTHER PUBLICATIONS

Notice of Termination of Reconsideration and Reconsideration Report by Examiner before Appeal dated Dec. 7, 2021 issued with respect to the corresponding Japanese patent application No. 2019-563112.

* cited by examiner

ZC
15000x  kV: 200.0  Tilt: 0  ⊢—⊣ 0.5 μm

ZrK
15000x  kV: 200.0  Tilt: 0  ⊢—⊣ 0.5 μm

POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

TECHNICAL FIELD

The present invention relates to a positive electrode active material for a lithium ion secondary battery, a method of manufacturing a positive electrode active material for a lithium ion secondary battery, and a lithium ion secondary battery.

BACKGROUND ART

In recent years, with the spread of portable electronic devices such as cellular phones and notebook PCs, there is a strong need for the development of compact, lightweight secondary batteries with high energy density and durability. In addition, the development of high-output secondary batteries for electric vehicles such as electric tools and hybrid vehicles is strongly desired.

Secondary batteries that satisfy such requirements include non-aqueous electrolyte secondary batteries such as lithium ion secondary batteries. The lithium ion secondary batteries consist of, for example, negative and positive electrodes and electrolytes, and use materials capable of desorbing and incorporating lithium as an active material for the negative and positive electrodes.

Research and development of the lithium ion secondary batteries are actively performed, and lithium ion secondary batteries using layered or spinel-shaped lithium metal complex oxide as a positive electrode material have been particularly commercialized as batteries with high energy density because of the high voltage of 4V class.

As positive electrode materials for such lithium ion secondary batteries, lithium complex oxides are proposed such as a lithium nickel complex oxide ($LiCoO_2$) that is relatively easy to synthesize, a lithium-nickel complex oxide ($LiNiO_2$) that uses nickel that is less expensive than cobalt, a lithium nickel cobalt manganese complex oxide ($LiNi_{0.33}Co_{0.33}Mn_{0.33}O_2$), a lithium manganese complex oxide ($LiMn_2O_4$) that uses manganese, and a lithium nickel manganese complex oxide ($LiNi_{0.5}Mn_{0.5}O_2$).

In addition, in recent years, for the purpose of further improving the performance, studies are underway on a positive electrode material in which an additive element is added.

For example, Patent Document 1 proposes a positive electrode active material for non-aqueous secondary batteries, which consists of a composition consisting of at least one compound consisting of lithium, nickel, cobalt, element M, niobium and oxygen, as shown in the general formula: $Li_aNi_{1-x-y-z}Co_xM_yNb_zO_b$ (where M is one or more elements selected from the group consisting of Mn, Fe and Al, $1 \leq a \leq 1.1$, $0.1 \leq x \leq 0.3$, $0 \leq y \leq 0.1$, $0.01 \leq z \leq 0.05$, and $2 \leq b \leq 2.2$), while exhibiting a discharge capacity of α [mAh/g] within a range of 2 V to 1.5 V at the first discharge, and when assuming that the half value width of a (003) surface of the layered crystal structure in the X-ray diffraction is β [deg], α and β simultaneously satisfy the conditions of $60 \leq \alpha \leq 150$ and $0.14 \leq \beta \leq 0.20$, respectively.

According to the positive electrode active material for the non-aqueous secondary battery proposed in Patent Document 1, that is the indication that the excellent discharge capacity and rapid heating stability are due to the presence of compounds of Li, Nb, and oxygen in the composition in addition to the compound of the layered crystal structure, and possibly due to the uniform formation of the Li—Nb—O compound at the crystal grain boundary of the compound of the layered crystal structure.

Patent Document 2 proposes a positive electrode active material for a non-aqueous secondary battery having at least a layered structure of a lithium transition metal complex oxide, wherein the lithium transition metal complex oxide is present in the form of a particle comprising one or both of the primary particles and secondary particles that are aggregates thereof, the aspect ratio of the primary particles is 1 to 1.8, and the positive electrode active material for a non-aqueous secondary battery includes at least one compound selected from the group consisting of molybdenum, vanadium, tungsten, boron and fluorine on at least a surface of the particles.

According to the positive active material for the non-aqueous electrolyte secondary battery proposed in Patent Document 2, the conductivity is improved by including a compound having at least one selected from the group consisting of molybdenum, vanadium, tungsten, boron and fluorine on the surface of the particle.

Patent Document 3 proposes a lithium transition metal compound powder for a lithium secondary battery positive electrode material that is fired after a lithium transition metal compound is used as a main component and a compound containing at least one element selected from B and Bi and a compound containing at least one element selected from Mo, W, Nb, Ta, and Re are added to the main component of the lithium transition metal compound having a function enabling incorporation and desorption of lithium ions. After adding the additional element at a specified ratio, the additional element is fired to obtain a lithium transition metal compound powder comprising fine particles with inhibited grain growth and sintering, thereby improving the rate and output characteristics, and at the same time, obtaining a lithium-containing transition metal compound powder that is easy to handle and to adjust electrodes.

Patent Document 4 proposes a composition for a non-aqueous electrolyte liquid secondary cell comprising a lithium transition metal compound represented by the general formula $Li_aNi_{1-x-y}Co_xM1_yW_zM^2_wO_2$ ($1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$, $M^1$ being at least one selected from the group consisting of Mn and Al, $M^2$ being at least one selected from the group consisting of Zr, Ti, Mg, Ta, Nb, and Mo) and a boron compound at least including an element of boron. By using a positive electrode composition comprising a lithium transition metal complex oxide, which requires nickel and tungsten, and a specific boron compound, the output characteristics and cycle characteristics can be improved in a positive electrode composition using a lithium transition metal complex, which has a low cobalt content or does not contain cobalt.

In addition, Patent Document 5 includes a non-aqueous electrolyte containing a gas generator that is contained in a battery case and reacts at a voltage higher than a predetermined voltage to generate gas, and a current interrupting mechanism that interrupts the electrical connection between the electrode and the external terminal when the internal pressure of the battery case is higher than a predetermined pressure, wherein the positive electrode includes a positive electrode current collector and a positive electrode active material layer that is retained in the positive electrode current collector and contains the positive electrode active material, and a lithium ion secondary cell is configured so that the amount of lithium hydroxide eluted from the positive electrode active material layer when the positive electrode active material layer is dipped in water is set to 0.014 mass % or more and 0.035 mass % or less when converted to Li in the positive electrode active material layer based on a neutralization titration method. Patent Document 5 proposes using general formula: $Li_xNi_aMn_bMe_cO_2$ (where x, a, b, and c in the formula are $0.99 \leq x \leq 1.12$, $0.9 \leq a+b+c \leq 1.1$, $1.1 \leq a/b \leq 1.7$, and $0 \leq c \leq 0.4$ are all satisfied, and Me is one or more elements selected from the group consisting of Co, Mg, Sr, Ti, Zr, V, Nb, Mo, W, B, and Al) as the complex oxide constituting the positive electrode active material. According to the lithium ion secondary battery, the amount of gas generated by the gas generant can be more appropriately secured while increasing the electronic conductivity of the positive electrode active material. Therefore, that is the indication that the current interruption mechanism can be properly operated while maintaining the high output characteristics.

PRIOR ART DOCUMENTS

Patent Documents

Patent Document 1: Japanese Laid-Open Patent Application Publication No. 2002-151071
Patent Document 2: Japanese Laid-Open Patent Application Publication No. 2005-251716
Patent Document 3: Japanese Laid-Open Patent Application Publication No. 2011-108554
Patent Document 4: Japanese Laid-Open Patent Application Publication No. 2013-239434
Patent Document 5: Japanese Laid-Open Patent Application Publication No. 2014-216061

SUMMARY OF THE INVENTION

Problems to be Solved by the Invention

The positive electrode of the lithium ion secondary battery is formed by mixing the positive electrode active material, a binding agent such as PVDF (polyvinylidene fluoride) and NMP (n-methyl-2-pyrrolidone), and various components to be added as necessary into a positive electrode slurry and applying to a current collector such as aluminum foil. Then, the positive electrode slurry sometimes turned into a gel, while decreasing operability and deterioration of the yield, which caused a problem.

Accordingly, in view of the above-described problems in the prior art, one aspect of the present invention is intended to provide a positive electrode active material for a lithium ion secondary battery that can inhibit gelation when used as slurry.

Means for Solving the Problem

In order to solve the above problem, according to an embodiment of the present invention, there is provided a positive electrode active material for a lithium ion secondary battery containing lithium nickel manganese complex oxide particles,
wherein the lithium nickel manganese complex oxide particles are composed of secondary particles formed of aggregated primary particles of a lithium nickel manganese complex oxide represented by a general formula $LidNi_{1-a-b-c}Mn_aM_bZr_cO_{2+\alpha}$ (where M is at least one element selected from Co, W, Mo, Mg, Ca, Al, Ti, Cr, and Ta, and is $0.05 \leq a < 0.60$, $0 \leq b < 0.60$, $0.00003 \leq c \leq 0.03$, $0.05 \leq a+b+c \leq 0.60$, $0.95 \leq d \leq 1.20$, and $-0.2 \leq \alpha \leq 0.2$),
wherein at least a portion of zirconium is dispersed in the primary particle, and
wherein the positive electrode active material for the lithium ion secondary battery contains an amount of excessive lithium obtained by a neutralization titration method is 0.02 mass % or more and 0.09 mass % or less.

Advantageous Effect of the Invention

According to an embodiment of the present invention, a positive electrode active material for a lithium ion secondary battery that can inhibit gelation can be provided when used as a positive electrode slurry.

MODE OF CARRYING OUT THE INVENTION

Figure 1:
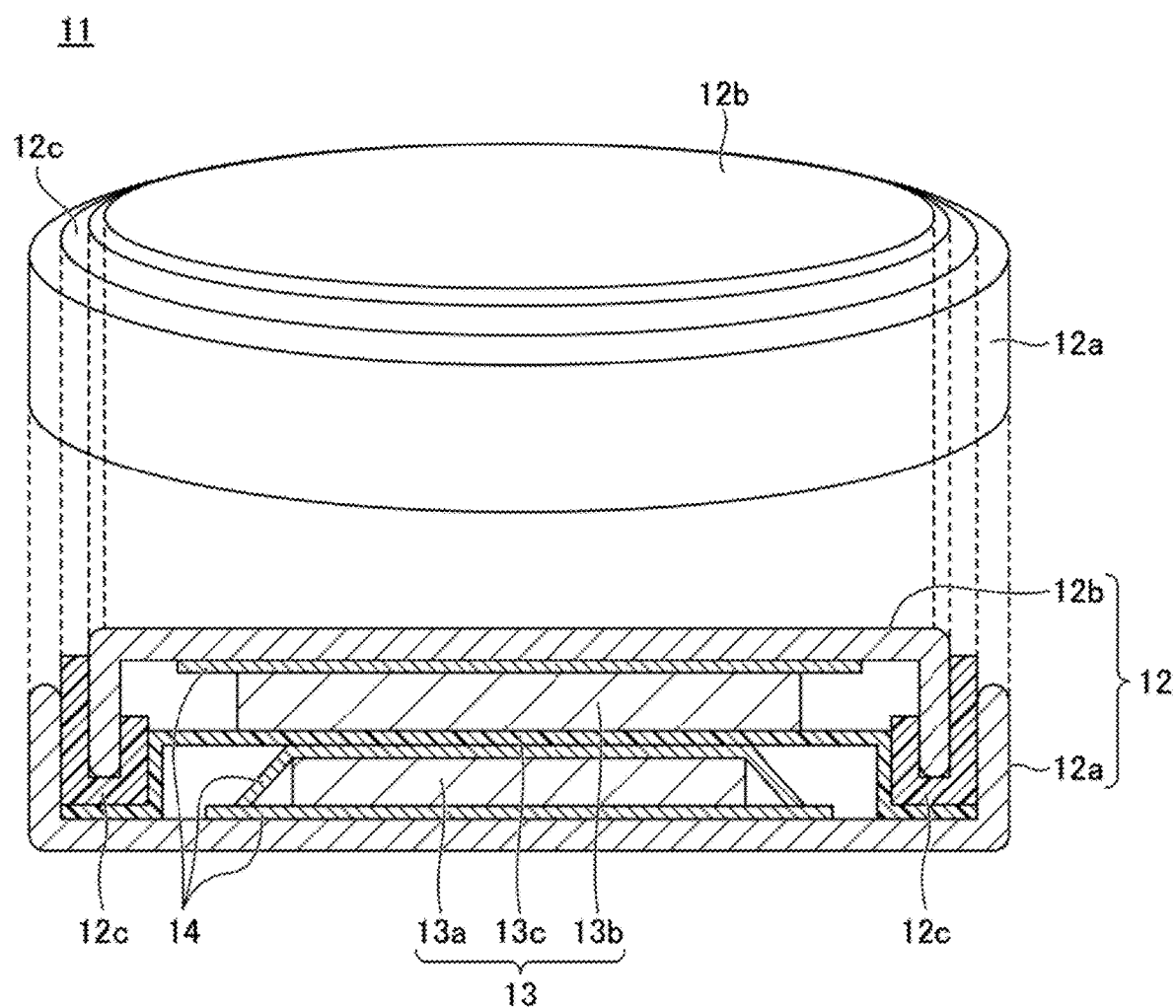
FIG. 1 is a is a schematic cross-sectional view of a coin-type battery used for battery evaluation.

[Positive Electrode Active Material for Lithium Ion Secondary Battery]

The inventors of the present invention thoroughly investigated the positive electrode active material that can inhibit gelation when used as a positive electrode slurry.

The inventors of the present invention first investigated the cause of gelation when the material is formed as a positive electrode slurry. As a result, if excessive lithium, which is a liberatable lithium component such as lithium carbonate, remains on the particle surface of the positive electrode active material, the excessive lithium is released when mixed with a binding agent, and may react with the moisture contained in the binding agent to form a lithium hydroxide. The inventors have found that the resulting lithium hydroxide reacts with the binding agent to form a gel. The inventors have found that this trend is more likely to occur when lithium in the positive electrode active material is more abundant than stoichiometric ratios and the proportion of nickel is higher. Incidentally, although the lithium hydroxide and lithium carbonate are used as raw materials for lithium when complex oxide particles of lithium metal, which is the active material of the positive electrode, are synthesized by calcination, the excessive lithium on the surface of particles of the positive electrode active material often takes the form of lithium carbonate.

Accordingly, the inventors of the present invention have further investigated and have found that the positive electrode active material containing lithium nickel manganese complex oxide particles with added zirconium can inhibit gelation when used as a positive electrode slurry, thereby completing the present invention.

The positive electrode active material for the lithium ion secondary battery according to the present embodiment (hereinafter, also referred to as "positive electrode active material") includes lithium nickel manganese complex oxide particles.

Such lithium nickel manganese complex oxide particles consist of secondary particles in which primary particles of lithium nickel manganese complex oxide represented by the general formula $Li_dNi_{1-a-b-c}M_bZr_cO_{2+\alpha}$ are aggregated, and at least part of zirconium disperses within the primary particles.

The additional element M in the above-described general formula can be at least one element selected from Co, W, Mo, Mg, Ca, Al, Ti, Cr, and Ta. In addition, a, b, c, d, and α preferably satisfy the following requirements: $0.05 \le a < 0.60$, $0 \le b < 0.60$, $0.00003 \le c \le 0.03$, $0.05 \le a+b+c \le 0.60$, $0.95 \le d \le 1.20$, and $-0.2 \le \alpha \le 0.2$.

The positive electrode active material according to the present embodiment can have an excessive lithium amount obtained by the neutralization titration method of not less than 0.02 mass % and not more than 0.09 mass %.

The positive electrode active material according to the present embodiment can have a residual carbon amount obtained by ICP emission spectroscopy of not less than 0.01 mass % and not more than 0.04 mass %.

The positive electrode active material of the present embodiment includes lithium nickel manganese complex oxide particles as described above. The positive electrode active material according to the present embodiment may be composed of lithium nickel manganese complex oxide particles. However, this does not preclude the inclusion of unavoidable ingredients in the manufacturing process.

The lithium nickel manganese complex oxide particles are polycrystalline particles composed of secondary particles in which the primary particles of the lithium nickel manganese complex oxide, which is represented by the above general formula, are aggregated.

The above-described general formula means that the lithium nickel manganese oxide compound particles contain each element component in the ratio of the mass shown in the formula, and does not mean that the compound is formed. That is, the lithium nickel manganese complex oxide particles of the above-described general formula mean that they contain lithium (Li), nickel (Ni), manganese (Mn), additional element M (M), zirconium (Zr), and oxygen (O) in the ratio Li:Ni:Mn:M:Zr:O=d:1−a−b−c:a:c:2+α.

The content of Mn in the above general formula a is preferably $0.05 \le a < 0.60$, and more preferably $0.10 \le a \le 0.55$. By setting the content a of Mn to the above-described range, it is possible to obtain excellent output characteristics, high energy density, and high thermal stability of the positive electrode active material. On the other hand, when a is less than 0.05, the improvement effect of thermal stability may not be sufficient, and when a is 0.60 or more, the output characteristics and energy density may be reduced.

The b, which indicates the content of the additional element M in the above-described general formula, is preferably $0 \le b < 0.60$, and more preferably $0 \le b < 0.55$. Because the lithium nickel manganese complex oxide may not contain the additional element M, b may be equal to or more than 0 as described above. Even when the additional element M is added, the b, which indicates the content of the additional element M as described above, is preferably less than 0.60 because the other manganese or zirconium content decreases when the additional element M is added excessively.

The additional element M may be at least one element selected from Co, W, Mo, Mg, Ca, Al, Ti, Cr, and Ta, that is, one or more elements selected from the above-described element groups.

The range of c, which indicates the content of Zr in the above general formula, is preferably $0.00003 \le c \le 0.03$. By setting the range of c to the above-described range, the reduction effect of excessive lithium and residual carbon can be sufficiently obtained, and when it is used as the positive electrode of the lithium ion secondary battery, sufficient battery capacity can be obtained for the battery. On the other hand, if c is less than 0.00003, the reduction effect of excessive lithium and residual carbon is not sufficiently obtained, and if c is greater than 0.03, the zirconium compound may be segregated and the output characteristics and the battery capacity may be reduced. The range of c is preferably $0.0005 \le c \le 0.025$, and the range of c is further preferably $0.001 \le c \le 0.02$, in order to achieve a combination of a higher reduction effect of lithium and residual carbon and superior battery characteristics.

The zirconium contained in the positive electrode active material of the present embodiment can be present, at least in part, in primary particles of lithium nickel manganese complex oxide. Other portions of the zirconium containing the positive electrode active material of the present embodiment can also be present as compounds containing lithium and zirconium on the surface of the primary particles of the lithium nickel manganese complex oxide.

Zirconium, which usually has a pentavalent valence, is an element with a higher valence than nickel in the positive active material, and the presence of such a high valence element reduces the need to increase the valence of nickel in the synthesis of lithium nickel manganese complex oxides compared with zirconium-free compounds. Zirconium also has the property of forming a compound with lithium in the high temperature range of 850° C. or more. Due to this property, a lithium component, such as excessive lithium carbonate, which remains as an unreacted material during a typical calcination reaction, reacts with zirconium to form a compound and can be present on the surface of the primary particles of the lithium nickel manganese complex oxide. Therefore, it is assumed that the effect of reducing the excessive lithium such as lithium carbonate and the residual carbon caused by the carbon contained in lithium carbonate is generated.

In addition, zirconium dispersed in the primary particles of the lithium nickel manganese complex oxide reacts with the excessive lithium, and the reduction effect of the excessive lithium and residual carbon is considered to be generated. The zirconium dispersed in the primary particles of the lithium nickel manganese complex oxide may also mitigate the cationic mixing of nickel atoms in the lithium nickel manganese complex oxide, which is easily formed when fired at high temperatures, to the lithium seat (site).

As described above, in the positive electrode active material according to the present embodiment, a compound containing lithium and zirconium (hereinafter, simply referred to as "lithium zirconium compound") is preferably present on the surface of the primary particle of the lithium nickel manganese complex oxide.

Such a lithium zirconium compound need not cover the entire surface of the primary particle of a lithium nickel manganese complex oxide complex, but can provide a reduction effect of excessive lithium and residual carbon, at least if present in a portion of the primary particle surface. As a result, gelation of the positive electrode slurry can be reduced. In addition, the lithium zirconium compound is preferably adhered to the surface of the primary particle of the lithium nickel manganese complex oxide.

The lithium zirconium compound is not particularly limited, but preferably at least one selected from, for example, $Li_2ZrO_3$, $Li_4ZrO_4$, and is more preferably $Li_2ZrO_3$. These lithium zirconium compounds can be confirmed, for example, by analyzing lithium nickel manganese complex oxide particles using the XRD (X-ray diffraction) method.

Here, the surface of the primary particle of the lithium nickel manganese complex oxide includes the surface of the primary particle exposed at the outer surface of the secondary particle and the surface of the primary particle exposed at the outer surface of the secondary particle, for example, near the surface of the secondary particle where the electrolyte is permeable and in the air space therein. In addition, the boundaries between primary particles are included if the binding of the primary particles is incomplete and the electrolyte is permeable.

In addition, because the lithium zirconium compound has the effect of reducing the excessive lithium and residual carbon regardless of the state, the state is not particularly limited. The lithium zirconium compound may be present, for example, in the crystalline state, in the coexistence state of crystals and amorphous, or in the amorphous state. When lithium zirconium compounds are present in crystalline form, their presence can be confirmed by X-ray diffraction measurements as the abundance increases.

As noted, the zirconium component can also be present in the primary particles of a lithium nickel manganese complex oxide. The distribution of zirconium in the primary particles of lithium nickel manganese complex oxides is not particularly limited. However, when the zirconium concentration is locally high, the reaction resistance is high and the cell characteristics may be degraded. Therefore, from the viewpoint of compatibility between the reduction effect of excessive lithium and residual carbon and the battery characteristics, the maximum zirconium concentration in the primary particle of the lithium nickel manganese oxide complex is preferably not more than three times the average zirconium concentration in the primary particle of the lithium nickel manganese oxide complex, and more preferably not more than two times.

The lower limit of the ratio of the maximum zirconium concentration to the average zirconium concentration in the primary particles of lithium nickel manganese complex oxides is not particularly limited. For example, the maximum zirconium concentration in the primary particles of the lithium nickel manganese complex oxide is preferably not less than 1.2 times the average zirconium concentration in the primary particles of the lithium nickel manganese complex oxide.

The distribution of zirconium concentration in primary particles of lithium nickel manganese complex oxides can be assessed by component analysis (e.g., EDX) by scanning transmission electron microscopy (STEM) of the primary particle cross section.

In addition, the range of a+b+c, which is the sum of a, b, and c, which represents the amount of manganese, the additional element M, and zirconium in the above-described general formula, is preferably 0.05≤a+b+c≤0.60.

As described above, because gelation of the positive electrode slurry is likely to occur particularly when the nickel content of the positive electrode active material is high, the positive electrode active material according to the present embodiment can exhibit particularly high effects. In addition, in the lithium nickel manganese complex oxide contained in the positive electrode active material according to the present embodiment, because a portion of nickel is replaced by manganese, the additional element M, and zirconium, the nickel content ratio can be sufficiently increased by setting a+b+c to 0.60 or less, thereby exhibiting a particularly high effect, which is preferable.

However, if the amount of substitution by these elements is not sufficient, sufficient battery characteristics may not be obtained when lithium ion secondary batteries are used. Therefore, a+b+c is preferably equal to or greater than 0.05.

Preferably, d, which represents lithium content in the above general formula, is 0.95≤d≤1.20. As described above, when the lithium content in the positive electrode active material is excessive than the stoichiometric ratio, gelation of the positive electrode slurry is particularly likely to occur. Therefore, the positive electrode active material according to the present embodiment is particularly effective. Therefore, d, which indicates the amount of lithium, is preferably not less than 0.95. However, the amount of excessive lithium may lead to increased lithium and residual carbon content. Therefore, d is preferably not more than 1.20.

The $\alpha$ of the 2+$\alpha$ representing the oxygen content in the above general formula satisfies the requirement of $-0.2 \leq \alpha \leq 0.2$. This is because the amount of oxygen may fluctuate in order to balance the electric charge due to oxygen deficiency, variation in the composition of the metal component and the like.

As described above, according to the positive electrode active material of the present embodiment, excessive lithium and residual carbon can be reduced. However, the amount of excessive lithium is preferably not less than 0.02 mass % and not more than 0.09 mass %. By setting the amount of excessive lithium of the positive electrode active material according to the present embodiment to 0.09 mass % or less, it is possible to inhibit the gelation of the positive electrode slurry when the positive electrode active material is used in manufacturing the positive electrode. Therefore, it is possible to prevent deterioration of operability and yield when preparing the positive electrode slurry or when manufacturing the positive electrode.

In addition, the lower limit of the amount of excessive lithium is not particularly limited and may be equal to or greater than 0, but the amount is preferably equal to or greater than 0.02 mass % from the viewpoint of productivity and the like.

The amount of excessive lithium can be determined by neutralization titration.

In addition, the amount of residual carbon is preferably not less than 0.01 mass % and not more than 0.04 mass %. Because residual carbon is mainly caused by excessive lithium in the form of lithium carbonate, the residual amount of positive electrode active carbon in the present embodiment is 0.04 mass % or less. Therefore, it is possible to inhibit gelation of the positive electrode slurry when manufacturing the positive electrode using the positive electrode active material. Therefore, it is possible to prevent deterioration of operability and yield when preparing the positive electrode slurry or when manufacturing the positive electrode.

In addition, the lower limit of the amount of residual carbon is not particularly limited and can be set to 0 or more, but the amount is preferably set to 0.01% or more by mass from the viewpoint of productivity and the like.

The residual carbon amount can be measured by ICP emission spectroscopy.

The secondary particles of the lithium nickel manganese complex oxide are not particularly limited in size. However, the volume average particle diameter MV is preferably 4 μm or more and 20 μm or less, and the volume average particle diameter is more preferably 5 μm or more and 15 μm or less. By setting the volume average particle size MV of the secondary particles of lithium nickel manganese complex oxide to the above-described range, the high output characteristics and the battery capacity when used for the positive electrode of the battery can be further compatible with the high filling characteristics of the positive electrode.

By setting the volume average particle diameter MV of such secondary particles to 4 µm or more, it is possible to achieve particularly high filling properties to the positive electrode. In addition, because the volume average particle diameter MV of such secondary particles is 20 µm or less, it is possible to obtain particularly high output characteristics and battery capacity.

Volumetric average particle size MV is the average particle size weighted by the particle volume and is the sum of the individual particle diameters multiplied by the volume of the particles divided by the total particle volume. Volumetric average particle size MV can be measured, for example, by laser diffraction scattering using a laser diffractometer.

In addition, although the crystallite diameter of the lithium nickel manganese oxide complex is not particularly limited, for example, the diameter is preferably 130 nm or more and 240 nm or less, and more preferably 130 nm or more and 210 nm or less.

[Method of Manufacturing Positive Electrode Active Materials for Lithium-Ion Secondary Battery]

According to the method of manufacturing the material for a lithium-ion secondary battery in accordance with the present embodiment (hereinafter simply referred to as "method of manufacturing the positive electrode active material"), the positive electrode active material described above can be manufactured. For this reason, some explanations already explained will be omitted.

The method of manufacturing the positive electrode active material according to the present embodiment relates to a method of manufacturing the positive electrode active material for a lithium ion secondary battery comprising the lithium nickel manganese complex oxide particles, wherein the primary particles of the lithium nickel manganese complex oxide represented by the general formula $Li_dNi_{1-a-b-c}Mn_aM_bZr_cO_{2+\alpha}$ are aggregated and at least a portion of zirconium is dispersed in the primary particles. It should be noted that M in the above-described general formula is at least one element selected from Co, W, Mo, Mg, Ca, Al, Ti, Cr, and Ta. In addition, a, b, c, d, and α preferably satisfies the following requirements: $0.05 \leq a < 0.60$, $0 \leq b < 0.60$, $0.00003 \leq c \leq 0.03$, $0.05 \leq a+b+c \leq 0.60$, $0.95 \leq d \leq 1.20$, and $-0.2 \leq \alpha \leq 0.2$.

The method of manufacturing the positive electrode active material according to the present embodiment can include the following steps.

A mixing process of obtaining a lithium zirconium mixture containing: a nickel manganese hydroxide complex particle represented by the general formula $Ni_{1-x-y}Mn_xM'_y(OH)_{2+\beta}$, a zirconium compound, and a lithium compound.

A baking step of obtaining a lithium nickel manganese complex oxide by firing the lithium-zirconium mixture at a temperature of 850° C. or higher and 1000° C. or lower in an oxidizing atmosphere.

The resulting positive electrode active material for lithium ion secondary batteries has an amount of excessive lithium determined by the neutralization titration method of not less than 0.02 mass % and not more than 0.09 mass %.

In addition, the resulting positive electrode active material for the lithium ion secondary battery preferably have a residual carbon amount obtained by ICP emission spectroscopy of 0.01% or more and 0.04% or less by mass.

The additional element M' according to the general formula of the nickel manganese compound hydroxide particles can be at least one element selected from Co, W, Mo, Mg, Ca, Al, Ti, Cr, Zr, and Ta. In addition, x, y, and β preferably satisfies the following conditions: $0.05 \leq x \leq 0.60$, $0 \leq y \leq 0.60$, $0.05 \leq x+y \leq 0.60$, and $-0.1 \leq \beta \leq 0.4$.

The x and y preferably satisfy $0.10 \leq x \leq 0.55$ and $0 \leq y \leq 0.55$.

In the above-described manufacturing method, one of the raw materials is a nickel compound hydroxide particle containing at least manganese, that is, a nickel manganese compound hydroxide particle. This ensures a uniform distribution of manganese within the primary particles of the resulting positive electrode active material, and the aforementioned high thermal stability effect obtained by containing manganese is sufficiently obtained.

In addition, because manganese is contained in the primary particle, it is possible to increase the firing temperature with the lithium compound, which will be described later, and to uniformly disperse zirconium in the primary particles.

If a mixture of a nickel hydroxide and a manganese compound is used instead of a nickel manganese compound hydroxide particle, or a coating of a manganese compound is used on a nickel hydroxide, the effect obtained by inclusion of manganese through the uneven distribution of manganese is not sufficiently obtained.

In the method of manufacturing the positive electrode active material according to the present embodiment, zirconium can be more evenly dispersed in the primary particles by firing the lithium zirconium mixture including the zirconium compound and the lithium compound in the firing step. The lithium compound is melted at a firing temperature and penetrated into nickel-manganese complex hydroxide particles to form a lithium nickel manganese complex oxide. The zirconium compound, along with the molten lithium compound, penetrates into the secondary particle. Also, the primary particles penetrate a grain boundary if the grain boundary is present. Permeation promotes diffusion within the primary particle and evenly disperses zirconium within the primary particle.

Furthermore, in the method of manufacturing the positive electrode active material according to the present embodiment, the firing temperature in the firing process is 850° C. or more and 1000° C. or less. This ensures melting of the lithium compound and promotes the penetration and diffusion of the zirconium compound. In addition, when the temperature is increased, the zirconium diffusion is accelerated, and the crystallinity of the obtained lithium nickel manganese complex oxide is increased, thereby improving the output characteristics and the energy density.

Hereinafter, each process will be described in detail.

(A) Mixing Process

The mixing step is a step of mixing the raw materials including nickel manganese compound hydroxide particles, zirconium compound, and lithium compound to obtain a lithium zirconium mixture.

As described above, the nickel manganese compound hydroxide particle is a nickel manganese compound hydroxide particle represented by the general formula $Ni_{1-x-y}Mn_xM'_y(OH)_{2+\beta}$, and the method of preparing the nickel manganese compound hydroxide is not particularly limited. However, a crystallization method or the like may be used.

The nickel manganese compound hydroxide particles can be also subjected to a heat treatment step prior to mixing with the zirconium and lithium compounds. That is, the method of manufacturing the positive electrode active material according to the present embodiment can further include a heat treatment step of heat treating the nickel manganese compound hydroxide particles prior to the mixing step.

By subjecting the nickel manganese compound hydroxide particles to a heat treatment step in advance, the moisture contained in the nickel manganese compound hydroxide particles can be removed and reduced.

By subjecting the nickel manganese compound hydroxide particles to a heat treatment step and sufficiently removing the residual moisture in the particles, the ratio (Li/Me) of the number of atoms of lithium (Li) in the positive electrode active material obtained to a metal other than lithium (Me) can be prevented from varying.

The temperature conditions of the heat treatment step are not particularly limited, and may be heated until the residual moisture in the nickel manganese compound hydroxide particles is heated to a temperature at which the residual moisture is removed, for example, preferably to 105° C. to 700° C. or less. The temperature of the nickel manganese compound hydroxide particles in the heat treatment process is preferably 105° C. or more, so that the residual water can be efficiently removed in a short time. Further, in the heat treatment step, when the temperature of the nickel manganese compound hydroxide particles when the heat treatment is performed is set to 700° C. or less, it is possible to particularly inhibit the particles converted from the nickel manganese compound hydroxide to sinter and aggregate.

When the nickel manganese compound hydroxide is converted to the nickel complex oxide in the heat treatment step, the temperature of the heat treatment is preferably 350° C. or more and 700° C. or less.

In the heat treatment process, the atmosphere in which the heat treatment is performed is not particularly limited. For example, it is preferable to perform in a simplified atmosphere or in an air stream.

In addition, although the heat treatment time in the heat treatment step is not particularly limited, because the residual water in the nickel manganese compound hydroxide may not be sufficiently removed for less than one hour, the heat treatment time is preferably one hour or more, and more preferably five hours or more and 15 hours or less.

The equipment used for performing the heat treatment in the heat treatment step is not particularly limited. For example, it may be suitably used if the nickel manganese compound hydroxide particles can be heated in an air stream. For example, an air blower dryer or an electric furnace with no gas generation can be suitably used as the equipment used for performing the heat treatment in the heat treatment step.

When the nickel manganese compound hydroxide particles are subjected to the heat treatment step, a compound containing the aforementioned additive element M' may be added to the nickel manganese compound hydroxide particles. In addition, when a compound containing the additional element M' is added, it is preferable that the additional element M' contained in the nickel manganese compound hydroxide particles to be subjected to the heat treatment step is smaller than the target composition corresponding to the amount to be added in the heat treatment step.

The zirconium compound used for the mixing process is not particularly limited if the compound contains zirconium, such as zirconium hydroxide, zirconium oxide, zirconium sulfide, zirconium chloride, zirconium sulfate, or the like. However, it is preferable to use one or more kinds of zirconium compound selected from zirconium hydroxide and zirconium oxide as zirconium compound in order to avoid heat stability and contamination of the lithium nickel manganese metal complex oxide obtained by firing with impurities that lead to a decrease in battery capacity and cycle characteristics.

The particle size of the zirconium compound used is not particularly limited. However, from the viewpoint of increasing handling and reactivity, the average particle diameter of the zirconium compound to be used is preferably 0.01 μm or more and 10 μm or less, more preferably 0.05 μm or more and 3.0 μm or less, and even more preferably 0.08 μm or more and 1.5 μm or less.

This is because the used average particle diameter of the zirconium compound is 0.01 μm or more, and the handling of the powder is excellent. In the mixing step and the firing step, the zirconium compound is scattered, and the composition of the positive electrode active material to be prepared is prevented from being deviated from the target composition.

In addition, because the used average particle diameter of the zirconium compound is set to be 10 μm or less, the zirconium can be particularly uniformly distributed among the lithium nickel manganese complex oxides obtained after firing, thereby increasing the thermal stability.

Mean particle size refers to the particle size at 50% of the total volume of all particles in the laser diffraction/scattering method, where the number of particles in each particle size is accumulated from the larger side.

A method of obtaining the zirconium compound having the above-described average particle size is a method of pulverizing the zirconium compound to a predetermined particle size using various pulverizers such as ball mills, planetary ball mills, jet mills and nanojet mills, bead mills, and pin mills. It may be also classified by dry classifier or sieve, if necessary. In particular, it is preferable to perform sieving to obtain particles of a zirconium compound having an average particle size of close to 0.01 μm.

The lithium compound used in the mixing process is not particularly limited, but one or more kinds selected from lithium carbonate and lithium hydroxide which have little influence on residual impurities and dissolve at the firing temperature can be preferably used. However, lithium carbonate that is easy to handle and inexpensive is more preferably used.

In the mixing process, for mixing nickel manganese compound hydroxide particles, zirconium compound, and lithium compound, a general mixer may be used, for example, a shaker mixer, a radige mixer, a julia mixer, a V-blender, and the like. Specific conditions for mixing are not particularly limited. It is preferable to select the conditions so that the nickel manganese compound hydroxide particles, the zirconium compound, and the lithium compound are mixed sufficiently without destroying the structure such as the nickel manganese compound hydroxide particles.

Nickel manganese compound hydroxide particles, zirconium compounds, and lithium compounds are preferably mixed so that Li/Me, which is the ratio of the number of atoms of lithium (Li) in a lithium zirconium mixture to a metal other than lithium (Me), is 0.95 or more and 1.20 or less. That is, it is preferable to mix Li/Me in the lithium zirconium mixture so as to be the same as Li/Me in the target composition in the positive electrode active material. This is because Li/Me in the lithium zirconium mixture prepared in this mixing step is approximately equal to Li/Me in the positive active material obtained after the firing step because Li/Me has little change before and after the firing step.

(B) Firing Step

In the firing step, the lithium zirconium mixture obtained in the mixing step is calcined at a temperature between 850° C. and 1000° C. in an oxidizing atmosphere to obtain a lithium nickel manganese complex oxide.

When the lithium zirconium mixture is fired in the firing step, lithium in the lithium compound diffuses into the nickel manganese compound hydroxide particles, while forming a lithium nickel manganese complex oxide composed of polycrystalline particles.

Also, zirconium in the zirconium compound diffuses into the nickel manganese compound hydroxide particles, and the zirconium reacts with lithium in the lithium compound to form a lithium zirconium compound. Then, there exists a lithium zirconium compound on the surface of the primary particle of the lithium nickel manganese complex oxide.

The firing temperature of the lithium zirconium mixture is preferably 850° C. or more and 1000° C. or less, and more preferably 900° C. or more and 950° C. or less.

By setting the firing temperature to 850° C. or higher, formation of lithium-zirconium compounds can be promoted and lithium and zirconium can be diffused sufficiently into nickel-manganese compound hydroxide particles. This reduces excessive lithium and reduces residual unreacted particles. In addition, when the crystal structure of the obtained positive electrode active material is sufficiently prepared and used as the positive electrode material of the lithium-ion secondary battery, the battery characteristics of the battery can be enhanced.

In addition, because the firing temperature is set to 1000° C. or less, it is possible to suppress the progress of sintering between particles of the lithium nickel manganese complex oxide produced, thereby suppressing the occurrence of abnormal particle growth. Incidentally, if abnormal particle growth occurs, the particles after firing may become coarse and become unable to retain the particle shape, and when the positive electrode active material is formed, there is a risk that a problem may arise in that the specific surface area decreases and the resistance of the positive electrode increases, thereby decreasing the battery capacity.

Preferably, the firing time is at least 3 hours, and more preferably 6 hours to 24 hours. This is because the formation of the lithium nickel manganese complex can be sufficiently advanced by three hours or more.

In addition, the atmosphere during firing is preferably an oxidizing atmosphere, and the atmosphere more preferably has an oxygen concentration of 3% or more and 100% or less by volume. This is because, by setting the oxygen concentration to 3% or more by volume, the oxidation reaction can be sufficiently accelerated, and the crystallinity of the lithium nickel manganese complex oxide can be particularly enhanced.

Incidentally, because the above-described range of oxygen concentration is used, the firing is preferably carried out in the atmosphere or in the oxygen stream, and the firing is preferably carried out in the oxygen stream, particularly considering the battery characteristics.

In the firing step, it may be calcined before firing at the aforementioned firing temperature, that is, from 850° C. to 1000° C.

Although the calcination temperature is not particularly limited, it is preferable that the temperature be 350° C. or more and lower than the calcination temperature, for example, so that the lithium compound melts and reacts with the nickel manganese compound hydroxide particles. In particular, it is more preferable that the calcination temperature be 400° C. or more and lower than the firing temperature, and that the temperature be such that the lithium compound melts and can react with the nickel manganese compound hydroxide particles. At such a temperature, the lithium zirconium mixture is calcinated so that the lithium compound and the zirconium compound penetrate into the nickel manganese compound hydroxide particles, thereby sufficiently diffusing lithium and zirconium, and particularly uniform lithium nickel manganese complex oxides can be obtained. For example, when lithium carbonate is used as a lithium compound, it is preferably calcined at a temperature of 400° C. or more and 700° C. or less for 1 hour or more and 10 hours or less.

The furnace used for firing is not particularly limited, but may be a furnace capable of firing a lithium zirconium mixture in a predetermined atmosphere, for example, atmosphere or an oxygen stream. However, an electric furnace with no gas generation is preferable, and either a batch-type furnace or a continuous-type furnace may be used.

In the lithium nickel manganese complex oxide obtained by sintering, sintering between particles is inhibited but may form coarse particles due to weak sintering and agglomeration. In such a case, it is preferable to adjust the particle size distribution by dissolving the aforementioned sintering and agglomeration.

The method of manufacturing the positive active material according to the present embodiment may further include any step. The method of manufacturing the positive electrode active material according to the present embodiment may further include a crystallization step of preparing nickel manganese compound hydroxide particles to be subjected to a mixing step, for example, by a crystallization method.

(C) Crystallization Step

The nickel manganese compound hydroxide particles subjected to the above-described mixing step are preferably obtained by, for example, a crystallization step.

The crystallization step is a step of crystallizing the nickel manganese compound hydroxide particles by adding an alkaline aqueous solution to a mixed aqueous solution containing at least nickel and manganese. The step is not particularly limited, as long as the method can obtain the nickel manganese compound hydroxide particles represented by the above-described general formula, but the step is preferably performed according to the following procedure.

First, an aqueous alkaline solution is added to a mixture of aqueous solutions containing at least nickel (Ni) and manganese (Mn) in the reactor to prepare an aqueous reaction solution (an aqueous reaction solution preparing step).

Then, the reaction aqueous solution is stirred at a constant rate to control pH, so that the nickel manganese compound hydroxide particles are co-precipitated and crystallized in the reactor (crystallization step).

While performing the crystallization step, the atmosphere in the reactor is not particularly limited. However, for example, the atmosphere may be atmospheric (air atmosphere), and nitrogen or the like may be also supplied if necessary. When a gas is supplied into a reaction vessel, it can be supplied by blowing it into a liquid in the reaction vessel, for example, an aqueous reaction solution, to adjust the dissolved oxygen concentration of the aqueous reaction solution.

Further, in the step of preparing the reaction aqueous solution, it is sufficient to prepare the reaction aqueous solution by mixing the mixed aqueous solution and the alkali aqueous solution in the reaction vessel, and the order of supply is not particularly limited. In the step of preparing the reaction aqueous solution, for example, water in which the temperature is adjusted may be preliminarily added to the reactor, and a mixed aqueous solution and an alkaline aqueous solution may be simultaneously supplied to the mixture aqueous solution.

The composition of the metallic element contained in the mixed aqueous solution and the composition of the metallic element contained in the nickel manganese compound hydroxide obtained after the crystallization step are almost identical. Thus, the composition of the metal element of the mixed aqueous solution can be adjusted to be the same as the composition of the metal element of the desired nickel-containing hydroxide.

Mixed aqueous solutions include nickel and manganese as described above. Thus, mixed aqueous solutions can be prepared by adding at least nickel salts and manganese salts to the water as the solvent. As will be described later, the mixed aqueous solution may be further supplemented with the salt of the additive element M', depending on the desired composition. The types of nickel and manganese salts are not particularly limited, but one or more salts selected from, for example, sulfate, nitrate, and chloride can be used. The nickel salt may be of a different type from the manganese salt, but preferably the same.

For example, one or more kinds of alkali aqueous solution selected from sodium hydroxide, potassium hydroxide, and the like may be used.

A complexing agent may be also added to the mixed aqueous solution in conjunction with an aqueous alkaline solution.

The complexing agent is not particularly limited and may be one capable of complexing with nickel ions or other metal ions in an aqueous solution, for example, an ammonium ion feeder. As the ammonium ion supply, for example, one or more kinds selected from ammonia, ammonium sulfate, ammonium chloride, ammonium carbonate, ammonium fluoride, and the like can be used, although not particularly limited.

The temperature of the reaction aqueous solution in the crystallization step and the pH are not particularly limited, but it is preferable to control the pH and the like, so that the dissolved nickel concentration in the reaction aqueous solution is not less than 5 mg/L and not more than 1000 mg/L. Incidentally, the dissolved nickel concentration in the reaction aqueous solution is not limited to the above-described range, and the range can be selected depending on the nickel ratio of the target lithium nickel manganese complex oxide.

When the complexing agent is not used in the crystallization step, the temperature of the reaction aqueous solution is preferably in the range of 60° C. to 80° C. or less, and the pH of the reaction aqueous solution is preferably not less than 10 and not more than 12 (25° C. basis).

By setting the pH of the reaction aqueous solution to 12 or less, it is possible to inhibit the excessive reduction of the nickel manganese compound hydroxide particles and to increase the filtration property. A spherical particle can be obtained by setting the pH to 12 or less.

By setting the pH of the aqueous reaction solution to 10 or higher, the rate of formation of the nickel manganese compound hydroxide particles can be increased and the productivity increased. In addition, as described above, because the formation reaction of the nickel manganese compound hydroxide particles can be sufficiently promoted, it is possible to prevent the nickel component from remaining in the filtrate when the crystallized object is separated by filtration after the crystallization step, thereby more reliably producing the nickel manganese compound hydroxide particles of the desired composition.

In addition, by setting the temperature of the reaction aqueous solution to 60° C. or higher, the nickel solubility can be increased, and the desired composition of the nickel manganese compound hydroxide particles can be co-precipitated more reliably. By setting the temperature of the reaction aqueous solution to 80° C. or less, the evaporation amount of water from the reaction aqueous solution is suppressed, and it is possible to prevent the slurry concentration from becoming excessively high. In addition, by setting the temperature of the reaction aqueous solution to 80° C. or less, because the evaporation amount of water can be inhibited as described above, the generation of crystals, such as sodium sulfate, can be prevented, and the resulting impurity concentration of the nickel manganese compound hydroxide particles can be lowered. Therefore, when the positive electrode active material prepared using the obtained nickel manganese compound hydroxide particles is applied to the lithium ion secondary battery, the charge/discharge capacity can be increased, which is preferable.

In contrast, when an ammonium ion supply such as ammonia is used as a complexing agent in the crystallization step, because the solubility of nickel is increased, the pH of the reaction aqueous solution is preferably not less than 10 and not more than 13 (based on a temperature of 25° C.), and the temperature of the reaction aqueous solution is preferably not less than 30° C. and not more than 60° C.

When the ammonium ion supply is used as the complexing agent as described above, the ammonia concentration in the reaction solution is preferably kept constant within a range of not less than 3 g/L and not more than 25 g/L in the reactor.

By setting the ammonia concentration in the reaction aqueous solution to 3 g/L or more, the solubility of the metal ions can be maintained at a constant level; a plate-like primary hydroxide particle having a preferable shape and particle size can be formed; and the expansion of the particle size distribution can be inhibited.

By setting the concentration of ammonia in the reaction aqueous solution to 25 g/L or less, it is possible to reduce an excessively high solubility of the metal ions, and the amount of metal ions remaining in the reaction aqueous solution is inhibited, thereby more reliably producing the desired composition of the nickel manganese compound hydroxide particles.

In addition, when the ammonia concentration in the reaction aqueous solution varies, the solubility of the metal ions varies, and uniform hydroxide particles may not be formed. Therefore, it is preferable to maintain a constant value. For example, the ammonia concentration is preferably maintained at the desired concentration with the upper and lower ranges, that is, the variation ranges being less than or equal to about 5 g/l.

After the crystallization step, that is, after the steady state, the precipitate can be collected, filtered and washed with water to obtain nickel manganese compound hydroxide particles (filtration and water washing steps).

Incidentally, in the case of a continuous system, the previously-described aqueous reaction solution preparation step and the crystallization step can be performed by continuously supplying the aqueous mixture solution, the aqueous alkali solution, and the aqueous solution containing the ammonium ion supply in some cases to the reactor. When feeding raw materials, such as a mixed aqueous solution, to a reaction vessel continuously, although the residence time in the reaction vessel of the mixed aqueous solution is not particularly limited, the feed rate of each solution is preferably adjusted so that the residence time becomes, for example, 3 hours or more and 12 hours or less from the viewpoint of sufficiently growing crystals and increasing productivity. The precipitate can then be collected by overflowing from the reactor, filtered, and washed with water to yield nickel manganese compound hydroxide particles (filtration, water washing steps).

Incidentally, although the method of incorporating the aforementioned additive element M' into the nickel manganese compound hydroxide particles is not particularly limited, salts containing the additive element M' are preferably added to a mixed aqueous solution containing at least nickel and manganese in order to increase the productivity of the crystallization step. By using a mixed aqueous solution in which the additional element M' is added, the nickel manganese compound hydroxide particles containing the additional element M' can be co-precipitated.

As described above, the additive element M' is at least one selected from Co, W, Mo, Mg, Ca, Al, Ti, Cr, Zr, and Ta, and can be optionally added to improve thermal stability, storage characteristics, battery characteristics, and the like. When zirconium is selected as the additional element M', it is preferable to adjust the amount of zirconium-compound to be added in the above-described mixing-step depending on the target composition of the positive electrode active material.

Examples of the salts containing the additional element M' include one or more selected from cobalt sulfate, sodium tungstate, tungsten oxide, molybdenum oxide, molybdenum sulfide, magnesium sulfate, magnesium chloride, calcium chloride, aluminum sulfate, sodium aluminate, titanium sulfate, ammonium peroxotitanate, potassium oxalate, zirconium hydroxide, zirconium sulfate, chromium chloride, sodium tantalate, tantalum, and the like. The salt containing the additional element M' is preferably dissolved in water and added to the mixed aqueous solution as an aqueous solution containing the additional element M'.

In order to optimize the crystallization conditions and control the composition ratio, after an alkaline aqueous solution is added to a mixed aqueous solution containing at least nickel and manganese for crystallization, a coating step may be provided to coat the crystal with the additive element M' to add the additive element M'.

As the coating method, there is no particular limitation, and a known method can be used.

For example, the first method includes a method of coating nickel manganese compound hydroxide particles without additional element M' obtained after the crystallization step, with the additional element M'.

As a second method, a part of the additive element M' is added during crystallization, and a coating of the additive element M' is performed on the nickel manganese compound hydroxide particles obtained after crystallization. Specifically, a mixed aqueous solution containing nickel, manganese and a portion of the additional element M' is prepared, and the nickel manganese compound hydroxide particles containing the additional element M' are crystallized (co-precipitated). The content of the additional element M' can then be adjusted by coating the nickel manganese compound hydroxide particles containing the resulting crystallized element M' with the additional element M'.

A configuration example of a procedure in which the additional element M' is coated on the nickel manganese compound hydroxide particles as in the above-described first method and the second method will be described below.

First, the nickel manganese compound hydroxide particles are dispersed in pure water to form a slurry (step of slurrying the nickel manganese compound hydroxide compound).

The resulting slurry is then mixed with a solution containing an amount of the additive element M' corresponding to the desired coating amount, and the acid is added dropwise to a predetermined pH and adjusted (addition of the additive element M'). At this time, one or more species selected from sulfuric acid, hydrochloric acid, nitric acid, or the like are preferably used as the acid.

Then, after mixing for a predetermined period of time, the nickel manganese compound hydroxide particles coated with the additional element M' can be obtained by filtration and drying (filtration, drying step).

Incidentally, the method of coating by the additional element M' is not limited to the above-described method. For example, a method of impregnating a solution containing a compound of the additional element M' or a method of drying a mixture of an aqueous solution containing a compound containing the additional element M' and nickel manganese compound hydroxide particles by spray drying or the like may be used.

[Lithium Ion Secondary Battery]

A lithium ion secondary battery in accordance with the present embodiment (hereinafter referred to as a "secondary battery") may have a positive electrode that includes the aforementioned active material.

Hereinafter, a configuration example of a secondary battery according to the present embodiment will be described for each component. The secondary cell in the present embodiment comprises, for example, a positive electrode, a negative electrode and a non-aqueous electrolyte, and is composed of the same components as a general lithium-ion secondary cell. It should be noted that the embodiments described below are merely exemplary, and the lithium-ion secondary batteries in the embodiments can be implemented in various modifications based on the knowledge of a person skilled in the art, including the following embodiments. In addition, the secondary battery does not particularly limit its use.

(Positive Electrode)

The positive electrode of the secondary cell in the present embodiment can include the positive electrode active material described above.

An example of a manufacturing method of the positive electrode will be described below. First, the aforementioned active material of the positive electrode (in powder form), the conductive material, and the binding agent (binder) can be mixed to form the positive electrode material. If necessary, activated carbon or a solvent for the purpose of adjustment of viscosity can be added, and the positive electrode material paste can be kneaded.

The mixing ratio of each material in the positive electrode alloy is a determinant of the performance of the lithium secondary battery and can be adjusted depending on the application. The mixing ratio of the materials may be the same as that of a known lithium secondary battery. For example, when the total mass of solids of the positive electrode material without solvent is 100 mass %, the positive electrode active material may contain 60 mass % or more and 95 mass % or less, the conductive material may contain 1 mass % or more and 20 mass % or less, and the binder may contain 1 mass % or more and 20 mass % or less.

The resulting positive electrode paste is applied, for example, to the surface of an aluminum foil current collector, dried to scatter solvent, and a sheet-like positive electrode is made. If necessary, pressure may be applied by roll press or the like to increase electrode density. The sheet-like positive electrode obtained in this way can be cut to a suitable size depending on the desired cell to be used for making the cell.

As the conductive material, for example, one or more kinds selected from graphite (natural graphite, artificial graphite, expanded graphite, and the like) or carbon black based material such as acetylene black or Ketchen black (trademark) can be used.

The binding agent (binder) serves to anchor the active material particles, for example, one or more selected from polyvinylidene fluoride (PVDF), polytetrafluoroethylene (PTFE), fluorine rubber, ethylene propylene diene rubber, styrene butadiene, cellulosic resin, polyacrylic acid, and the like can be used.

If necessary, a positive electrode active material, a conductive material, or the like may be dispersed to add a solvent to dissolve the binding agent to the positive electrode active material. For example, an organic solvent such as N-methyl-2-pyrrolidone may be used as the solvent. Activated carbon can also be added to the positive electrode material to increase the electrical double layer capacity.

The positive electrode manufacturing method is not limited to the exemplary method described above, but may be by other methods. For example, the positive electrode active material may be pressed and molded and then dried under vacuum.

(Negative Electrode)

The negative electrode may be a metal lithium, a lithium alloy, or the like. The negative electrode may be formed by mixing an adhesive with a negative electrode active material capable of absorbing and desorbing lithium ions, applying an appropriate solvent to the surface of a metal foil current collector such as copper, drying, and compressing to increase the electrode density if necessary.

As for the negative active material, for example, natural graphite, organic compound calcines such as artificial graphite and phenolic resins, and powders of carbon materials such as coke can be used. In this case, a fluorine-containing resin such as PVDF may be used as the negative electrode as well as the positive electrode, and an organic solvent such as N-methyl-2-pyrrolidone may be used as the solvent for dispersing the active material and the binding agent.

(Separator)

A separator can be sandwiched between the positive and negative electrodes as needed. The separator separates the positive electrode from the negative electrode and retains the electrolyte. The separator is a thin film, such as polyethylene or polypropylene, which is well known in the art and has a number of microscopic pores.

(Non-Aqueous Electrolyte)

For example, a non-aqueous electrolytic solution may be used as the non-aqueous electrolyte.

As a non-aqueous electrolytic solution, for example, a lithium salt as a supporting salt may be dissolved in an organic solvent. As a non-aqueous electrolyte, a lithium salt dissolved in an ionic liquid may be used. The ionic liquid is composed of cations and anions other than lithium ions and refers to salts that are liquid even at room temperature.

As the organic solvent, one type selected from a cyclic carbonate, such as ethylene carbonate, propylene carbonate, butylene carbonate, and trifluoropropylene carbonate; a chain-like carbonate, such as diethyl carbonate, dimethyl carbonate, ethyl methyl carbonate, and dipropyl carbonate; an ether compound, such as tetrahydrofuran, 2-methyl tetrahydrofuran, and dimethoxyethane; a sulfur compound, such as ethyl methyl sulfone and butane; and a phosphorus compound, such as triethyl phosphate and trioctyl phosphate, may be used alone, and may be used by mixing two or more kinds.

The supporting salt may be $LiPF_6$, $LiBF_4$, $LiClO_4$, $LiAsF_6$, $LiN(CF_3SO_2)_2$, or a composite salt thereof. In addition, the non-aqueous electrolyte may contain radical scavengers, surfactants, flame retardants and the like.

As the non-aqueous electrolyte, a solid electrolyte may be used. Solid electrolytes have the property to withstand high voltages. Examples of the solid electrolyte include inorganic solid electrolyte and organic solid electrolyte.

Examples of the inorganic solid electrolyte include an oxide-based solid electrolyte and a sulfide-based solid electrolyte.

The oxide-based solid electrolyte is not particularly limited. For example, a material containing oxygen (O) and having a lithium ion conductivity and an electron insulating property may be preferably used. Examples of oxide-based solid electrolytes include lithium phosphate ($Li_3PO_4$), $Li_3PO_4NX$, $LiBO_2NX$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \leq X \leq 1$), $Li_{1+X}Al_XGe_{2-X}(PO_4)_3$ ($0 \leq X \leq 1$), $LiTi_2(PO_4)_3$, $Li_3XLa_{2/3}$—$XTiO_3$ ($0 \leq X \leq 2/3$), $Li_5La_3Ta_2O_{12}$ Examples include $Li_7La_3Zr_2O_{12}$, $Li_6Ba_2Ta_2O_{12}$, and $Li_{3.6}Si_{0.6}P_{0.4}O_4$.

The sulfide-based solid electrolyte is not particularly limited. For example, a material containing sulfur (S) and having a lithium ion conductivity and an electron insulating property may be preferably used. Examples of the sulfide-based solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_{2s}$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, and the like.

The inorganic solid electrolyte other than the above may be used. For example, $Li_3N$, $LiI$, $Li_3N$—$LiI$—$LiOH$, or the like may be used.

The organic solid electrolyte is not particularly limited in the case of a polymer compound exhibiting ionic conductivity. For example, polyethylene oxide, polypropylene oxide, copolymers thereof, and the like may be used. The organic solid electrolyte may also contain a supporting salt (lithium salt).

(Shape and Configuration of Secondary Battery)

The lithium-ion secondary batteries of the embodiments described above can be of various shapes, such as cylindrical or stacked shapes. In any form, when the secondary battery according to the present embodiment uses a non-aqueous electrolyte as the non-aqueous electrolyte, the positive electrode and the negative electrode can be formed by laminating through a separator to form an electrode body, and the obtained electrode can be sealed to the battery case by impregnating the non-aqueous electrolyte and connecting between the positive electrode collector and the positive electrode terminal passing through the outside and between the negative electrode collector and the negative electrode terminal passing through the outside using a collector lead or the like.

As described above, the secondary cell according to the present embodiment is not limited to a foist using a non-aqueous electrolyte as a non-aqueous electrolyte, and may be, for example, a secondary cell using a solid non-aqueous electrolyte, that is, a total solid cell. In the case of a total solid battery, the configuration other than the active material of the positive electrode can be changed as necessary.

The secondary batteries of the present embodiment are suitable for powering compact portable electronic devices (such as notebook personal computers and mobile phone terminals) that require high capacity at all times, and for powering electric vehicles that require high output.

In addition, the secondary battery according to the present embodiment is particularly superior in safety, and further excellent in output characteristics and capacity. Therefore, because it is possible to reduce the size and to increase the output, the secondary battery according to the present embodiment is suitable as a power supply for an electric vehicle that is limited by the mounting space.

The secondary battery according to the present embodiment can be used not only as a power source for an electric vehicle driven by purely electrical energy, but also as a power source for a so-called hybrid vehicle combined with a combustion engine such as a gasoline engine or a diesel engine.

EXAMPLE

Although the invention will be described in further detail below with reference to the embodiments and comparisons of the invention, the invention is not limited to these examples at all. Various evaluation methods of the positive electrode active material in the Examples and Comparative Examples are as follows.

(1) Analysis of Composition and Residual Carbon

The composition and residual carbon content of the positive electrode active material obtained in the following examples and comparison examples were evaluated by ICP emission spectroscopy using an ICP emission spectrometer (model: ICPS8100, manufactured by Shimazu Corporation).

(2) Volume Average Particle Size MV

The volume average particle size of the positive electrode active material obtained in the following examples and comparison examples was evaluated using a laser diffraction scattering particle size distribution measuring device (Micro-Track HRA manufactured by Nikkiso Co., Ltd.).

(3) Analysis of Excessive Lithium

Excessive lithium was evaluated by the Warder method, one of the neutralization titration methods. From the evaluation results, lithium hydroxide (LiOH) and lithium carbonate ($Li_2CO_3$) were calculated, and the sum of these lithium amounts was defined as the excessive lithium amount.

Specifically, the obtained positive electrode active material was stirred with pure water, and the compound state of lithium eluted from the neutralization point was evaluated by adding hydrochloric acid while measuring the pH of the filtered filtrate.

The titration described above was measured to the second neutralization point. The amount of lithium in the filtrate was calculated from the amount of hydrochloric acid and the concentration of hydrochloric acid dropped up to the second neutralization point by regarding the alkaline content neutralized with hydrochloric acid up to the second neutralization point as the amount of lithium derived from lithium hydroxide (LiOH) and lithium carbonate ($Li_2CO_3$) (Li).

Then, the amount of lithium in the calculated filtrate was divided by the amount of a sample of the positive electrode active material used in preparing the filtrate, and the unit was converted to mass % to obtain the excessive lithium.

(4) Presence of Crystallite Diameter and Different Phases

An XRD diffractometer (Paralympic Inc., X'Pert PRO) was used to measure the half value width of the reflection peak of the (003) surface by CuKα radiation using the Schler method. The obtained XRD patterns were homologously identified to confirm that there were no different phases, such as lithium zirconium compounds, other than lithium nickel manganese complex oxides. If a different phase was identified, homology was performed to confirm the composition of the different phase.

(5) Initial Charge and Discharge Capacity

The 2032-type coin battery 11 shown in FIG. 1 (hereinafter referred to as a "coin battery") was used for the evaluation of the positive electrode active material obtained in the following examples and comparative examples.

As shown in FIG. 1, the coin-type cell 11 includes a case 12 and an electrode 13 contained within the case 12.

The case 12 has a positive electrode can 12a that is hollowed out and has one open end, and a negative electrode can 12b that is disposed in the opening of the positive electrode can 12a. When the negative electrode can 12b is disposed at an opening of the positive electrode can 12a, a space to accommodate the electrode 13 is formed between the negative electrode can 12b and the positive electrode can 12a.

The electrode 13 consists of a positive electrode 13a, a separator 13c, and a negative electrode 13b and is stacked in this order. The positive electrode 13a contacts the inner surface of the positive electrode can 12a via a current collector 14 and the negative electrode 13b contacts the inner surface of the negative electrode can 12b via a current collector 14. The positive electrode 13a is housed in the case 12. A current collector 14 is also disposed between the positive electrode 13a and the separator 13c.

The case 12 includes a gasket 12c through which the relative movement is fixed so that the positive electrode can 12a and the negative electrode can 12b remain non-contacting. The gasket 12c also has a function of sealing the gap between the positive electrode can 12a and the negative electrode can 12b and sealing the inside and the outside of the case 12.

The coin cell 11 shown in FIG. 1 was fabricated as follows.

First, 52.5 mg of the positive electrode active material, 15 mg of acetylene black, and 7.5 mg of polytetrafluoroethylene (PTFE) resin were mixed, and pressed and molded at a pressure of 100 MPa to a diameter of 11 mm and a thickness of 100 μm to prepare the positive electrode 13a. The prepared positive electrode 13a was dried in a vacuum dryer at 120° C. for 12 hours.

The positive electrode 13a, the negative electrode 13b, the separator 13c, and the electrolyte solution were used to make the coin-type cell 11 described above in a glove box in an Ar atmosphere in which the dew point was controlled to −80° C.

As the negative electrode 13b, a lithium (Li) metal having a diameter of 17 mm and a thickness of 1 mm was used. A polyethylene porous membrane with a thickness of 25 μm was used for the separator 13c. For the electrolyte solution, an equal volume mixture of ethylene carbonate (EC) and diethyl carbonate (DEC) containing 1M $LiClO_4$ as the supporting electrolyte (supporting salt) (manufactured by Toyama Pharmaceutical Co., Ltd.) was used.

The initial discharge capacity indicative of the performance of the manufactured coin-type cells 11 was evaluated as follows.

The initial charge/discharge capacity was initially left for about 24 hours after fabrication of the coin-type battery 11 shown in FIG. 1, and after the open circuit voltage OCV (open circuit voltage) was stabilized, the current density relative to the positive electrode was set to 0.1 mA/cm² and the cutoff voltage was charged to 4.3 V to obtain the initial charge capacity. Then, after a pause of one hour, the capacity at which the cutoff voltage was discharged to 3.0 V was defined as the initial discharge capacity. Multi-channel voltage/current generator (Advantest, R6741A) was used to measure charge/discharge capacitance.

Example 1

(Crystallization Step)

50 L of pure water was added to the reactor (60 L), and the temperature in the reactor was set to 45° C. while stirring. At this time, $N_2$ gas and air gas were passed through the reactor so that the dissolved oxygen concentration in the reactor liquid was 0.8 mg/L. A reaction aqueous solution was prepared by simultaneously adding a mixed aqueous solution, an alkaline aqueous solution, and a complexing agent in the reactor (step of preparing the reaction aqueous solution).

As the mixed aqueous solution, an aqueous solution having a metal ion concentration of 2.0 mol/L, wherein nickel sulfate, cobalt sulfate, and manganese sulfate are dissolved, was used so that the ratio of the amount of nickel to cobalt to manganese (mole) is 55:25:20.

A 25 mass % sodium hydroxide solution was used as the alkali aqueous solution, and a 25 mass % ammonia solution was used as the complexing agent.

In the reaction aqueous solution preparation step, the flow rate of each solution was controlled so that the residence time in the reactor of the reaction aqueous solution was 8 hours. In addition, the dissolved nickel concentration in the aqueous solution of the reaction vessel was adjusted to be not less than 10 and not more than 13 (based on a 25° C. temperature), and the ammonia concentration was adjusted to not less than 11 g/L and not more than 15 g/L so that the dissolved nickel concentration in the aqueous solution of the reaction vessel was 350 mg/L, so that the nickel manganese compound hydroxide was crystallized (crystallization step).

After the reactor was stabilized, slurry containing nickel manganese compound hydroxides was recovered from the overflow port, and then filtered to obtain a cake of nickel manganese compound hydroxides. The impurities were washed (filtration and water washing steps) by passing 1 L of pure water through 140 g of nickel manganese compound hydroxide in the filtered denber (filter fabric).

The powder after filtration was dried to obtain nickel manganese compound hydroxide particles represented by $Ni_{0.55}Co_{0.25}Mn_{0.20}(OH)_{2+\beta}$ ($0 \leq \beta \leq 0.4$).

(Mixing Step)

The resulting nickel cobalt manganese hydroxide complex particles, lithium carbonate, and zirconium oxide ($ZrO_2$) with an average particle size of 1.0 µm were mixed to afford a lithium zirconium mixture.

Incidentally, at the time of mixing, the ratio of the amount of nickel:cobalt:manganese:zirconium in the lithium zirconium mixture (mole) was 54.7:24.9:19.9:0.5, and the ratio of the number of atoms (Li/Me) of lithium to the total amount of metal other than lithium (nickel, cobalt, manganese, and zirconium) was measured at 1.03.

The weighed raw materials were thoroughly mixed using a shaker mixer (TURBULA Type T2C manufactured by Willie-E Bakofen (WAB)).

(Sintering Step)

The lithium zirconium mixture prepared in the mixing process was burned by holding at 900° C. for 10 hours in an atmosphere (oxygen concentration: 21% by volume) stream.

Thereafter, the positive electrode active material consisting of particles of a lithium nickel manganese complex oxide was obtained by crushing. Particles of the lithium nickel manganese oxide complex were observed under a scanning electron microscope, confirming that the primary particles were composed of aggregated secondary particles. The volume average particle size MV, an amount of excessive lithium, crystallite size, and the presence or absence of abnormal phases of the obtained positive electrode active material were measured. In addition, a coin-type battery was manufactured using the positive electrode active material, and the initial charge/discharge capacity was evaluated. The results are given in Table 1.

Component analysis of the obtained positive electrode active material confirmed that the target composition was obtained. That is, Li/Me=1.03, and it was confirmed that the composition ratio of other metals was the result shown in Table 1.

In addition, when the primary particle cross-section of lithium nickel manganese complex oxide contained in the positive electrode active material was evaluated by EDX, it was also confirmed that zirconium was uniformly dispersed inside the particle.

Example 2

(Crystallization Step)

Nickel manganese compound hydroxide particles represented by $Ni_{0.55}Co_{0.25}Mn_{0.20}(OH)_{2+\beta}$ ($0 \leq \beta \leq 0.4$) were obtained in the same manner as in the crystallization step of Example 1.

(Mixing Step)

The resulting nickel cobalt manganese hydroxide complex particles, lithium carbonate, and zirconium oxide ($ZrO_2$) with an average particle size of 1.0 µm were mixed to afford a lithium zirconium mixture.

Incidentally, at the time of mixing, the ratio of the amount of nickel:cobalt:manganese:zirconium in the lithium zirconium mixture (mole) was 54.6:24.7:19.7:1.0, and Li/Me was measured to be 1.03.

The weighed raw materials were thoroughly mixed using a shaker mixer (TURBULA Type T2C manufactured by Willie-E Bakofen (WAB)).

(Sintering Step)

The lithium zirconium mixture prepared in the mixing process was calcined and crushed under the same conditions as those in Example 1 to obtain a positive electrode active material comprising particles of lithium nickel manganese complex oxide. Particles of the lithium nickel manganese oxide complex were observed under a scanning electron microscope, confirming that the primary particles were composed of aggregated secondary particles. The volume average particle size MV, amount of excessive lithium, crystallite size, and the presence or absence of abnormal phases of the obtained positive electrode active material were measured. In addition, a coin-type battery was manufactured using the positive electrode active material, and the initial charge/discharge capacity was evaluated. The results are given in Table 1.

Component analysis of the obtained positive electrode active material confirmed that the target composition was achieved. That is, Li/Me=1.03, and it was confirmed that the composition ratio of other metals was the result shown in Table 1.

In addition, when the primary particle cross-section of lithium nickel manganese complex oxide contained in the positive electrode active material was evaluated by EDX, it was also confirmed that zirconium was dispersed approximately evenly inside the particle.

Example 3

(Crystallization Step)

In the same manner as Example 1, $Ni_{0.55}Co_{0.20}Mn_{0.25}(OH)_{2+\beta}$ ($0 \leq \beta \leq 0.4$) was obtained except that an aqueous solution containing 2.0 mol/L of metal ion, from which the nickel sulfate, cobalt sulfate, and manganese sulfate were dissolved, was used so that the ratio of the amount (mol) of nickel to cobalt was 55:20:25.

(Mixing Step)

The resulting nickel cobalt manganese hydroxide complex particles, lithium hydroxide, and zirconium oxide ($ZrO_2$) with an average particle size of 1.2 μm were mixed, and a lithium zirconium mixture was obtained.

Incidentally, at the time of mixing, the lithium zirconium mixture was measured so that the ratio of the amount of nickel:cobalt:manganese:zirconium in the lithium zirconium mixture (mole) was 54.7:19.9:24.9:0.5, and that the ratio of the number of atoms (Li/Me) of lithium to the total amount of metal other than lithium (nickel, cobalt, manganese, and zirconium) became 1.03.

The weighed raw materials were thoroughly mixed using a shaker mixer (TURBULA Type T2C manufactured by Willie-E Bakofen (WAB)).

(Sintering Step)

The lithium zirconium mixture prepared in the mixing process was baked at 915° C. for 15 hours in an atmosphere (oxygen concentration: 21% by volume) stream.

Thereafter, the positive electrode active material consisting of particles of a lithium nickel manganese complex oxide was obtained by crushing. Particles of lithium nickel manganese complex oxides were observed under a scanning transmission electron microscope, confirming that the primary particles were composed of aggregated secondary particles. For the obtained positive electrode active material, the volume average particle size MV, amount of excessive lithium, crystallite size, presence or absence of different phases, and residual carbon were measured. In addition, a coin-type battery was manufactured using the positive electrode active material, and the initial charge/discharge capacity was evaluated. The results are given in Table 1.

Component analysis of the obtained positive electrode active material confirmed that the target composition was achieved. That is, Li/Me=1.03, and it was confirmed that the composition ratio of other metals was the result shown in Table 1.

Figure 2A:
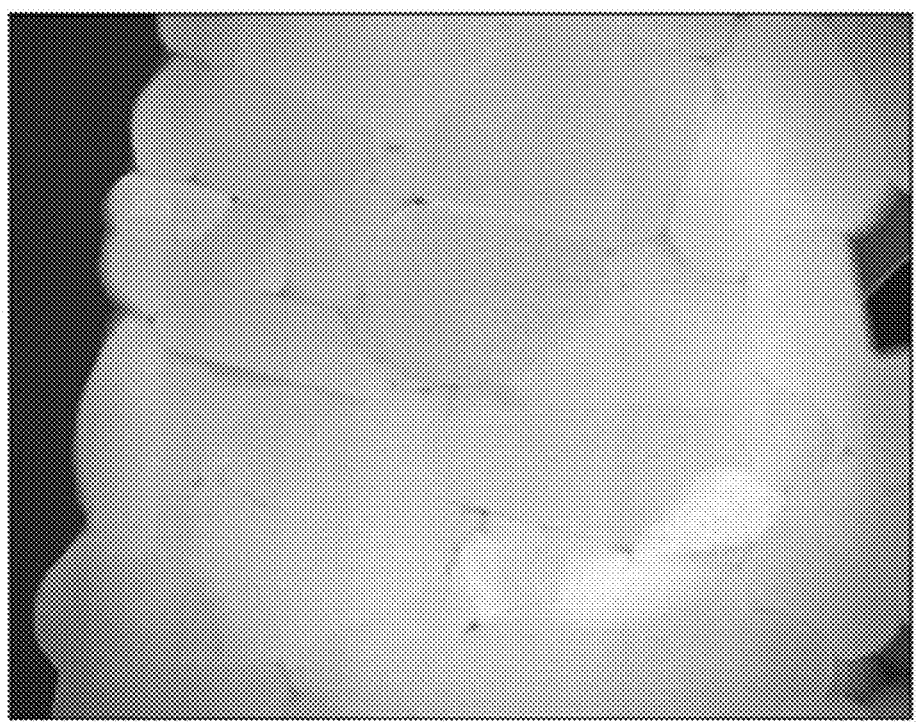
FIG. 2A is a STEM view of a cross section of a positive electrode active material obtained in Example 3.
Figure 2B:
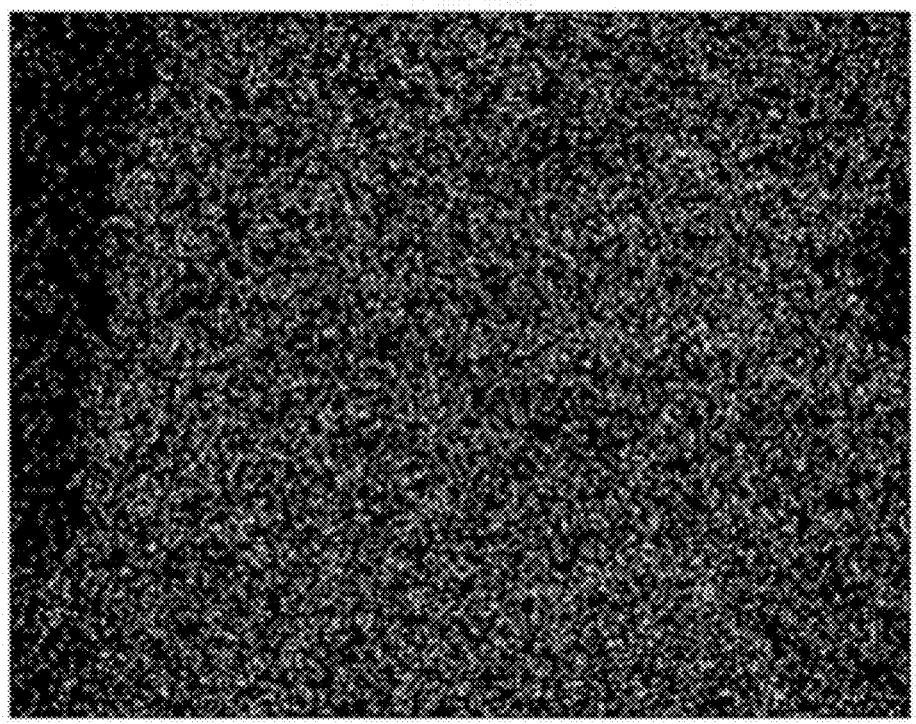
FIG. 2B is an EDX plane analysis image of a particle cross section of a positive electrode active material obtained in Example 3 with respect to Zr.

The STEM-EDX (Scanning Transmission Electron Microscope-Energy Dispersive X-ray Spectroscope) analysis of the particle cross-section was also performed. The results are shown in FIGS. 2A and 2B. FIG. 2A is a STEM image and FIG. 2B is an EDX analysis or mapping result for Zr.

A comparison between FIGS. 2A and 2B shows no segregation of zirconium (Zr) and that zirconium is solidified in the crystalline structure. In other words, it was confirmed that zirconium was evenly dispersed inside the particles.

Example 4

A heat treatment step in which the nickel manganese compound hydroxide particles are heat treated for 10 hours at a temperature of 600° C. in an atmospheric atmosphere was performed in advance, and the positive electrode active material was obtained and evaluated in the same manner as Example 3 except that the nickel manganese compound hydroxide particles after the heat treatment step are subjected to the mixing step. Evaluation results are given in Table 1.

The obtained particles of the lithium nickel manganese oxide complex were observed under a scanning electron microscope, and it was confirmed that the primary particles were composed of aggregated secondary particles.

Composition analysis of the obtained positive electrode active material revealed that the target composition was achieved. That is, Li/Me=1.03, and it was confirmed that the composition ratio of other metals coincided with the result shown in Table 1.

When the primary particle cross section of lithium nickel manganese complex oxide contained in the positive electrode active material was evaluated by EDX, it was also confirmed that zirconium was uniformly dispersed inside the particle.

Comparative Example 1

In the mixing step, the obtained nickel manganese compound hydroxide particles and lithium carbonate were weighed so that Li/Me=1.03 without using zirconium oxide, and the positive electrode active material was obtained and evaluated in the same manner as Example 1 except that the mixture to be subjected to the firing step was prepared. Evaluation results are given in Table 1.

Comparative Example 2

In the crystallization process, an aqueous solution with a metal ion concentration of 2.0 mol/L was used in which nickel sulfate, cobalt sulfate, and manganese sulfate were dissolved so that the ratio of the amount of nickel to cobalt to manganese (mole) was 70:15:15 as a mixed aqueous solution.

In addition, in the firing step, it was fired while holding at 840° C. for 10 hours in an atmospheric (oxygen concentration: 21% by volume) stream.

Other than the above points, the positive electrode active material was obtained and evaluated in the same manner as Comparative Example 1. Evaluation results are given in Table 1.

Comparative Example 3

In the mixing process, the ratio of the nickel:cobalt:manganese:zirconium content (moles) in the lithium zirconium mixture was 69.2:14.9:14.9:1.0, and weighed to make Li/Me=1.03. Except for the point of mixing, the positive electrode active material was obtained and evaluated in the same manner as Comparative Example 2. Evaluation results are given in Table 1.

Comparative Example 4

In the mixing step, the ratio of the nickel:cobalt:manganese:zirconium content (moles) in the lithium zirconium mixture was 68.6:14.7:14.7:2.0, and weighed to obtain Li/Me=1.03. Except for the point of mixing, the positive electrode active material was obtained and evaluated in the same manner as Comparative Example 2. Evaluation results are given in Table 1.

Comparative Example 5

In the mixing step, the positive electrode active material was obtained and evaluated in the same manner as Example 3, except that lithium carbonate was used instead of lithium hydroxide and zirconium oxide was not mixed. Evaluation results are given in Table 1.

TABLE 1

| | COMPOSITION PROPORTION OF Ni, Co, Mn AND Zr IN LITHIUM NICKEL MANGANESE COMPOSITE OXIDE (SUBSTANCE MASS PROPORTION) | | | | FIRING TEMPERATURE | VOLUME AVERAGE PARTICLE SIZE MV | MELTING Li AMOUNT | RESIDUAL CARBON AMOUNT | DIFFERENT PHASE | CRYSTALLITE SIZE | INITIAL CHARGE CAPACITY | INITIAL DISCHARGE CAPACITY |
|---|---|---|---|---|---|---|---|---|---|---|---|---|
| | Ni | Co | Mn | Zr | [° C.] | [μm] | [MASS %] | [MASS %] | PHASE | [nm] | [mAh/g] | [mAh/g] |
| EXAMPLE 1 | 54.7 | 24.9 | 19.9 | 0.5 | 900 | 13.5 | 0.064 | — | Li$_2$ZrO$_3$ | 217.7 | 195.1 | 176.8 |
| EXAMPLE 2 | 54.6 | 24.7 | 19.7 | 1.0 | 900 | 13.2 | 0.071 | — | Li$_2$ZrO$_3$ | 207.8 | 194.3 | 175.3 |
| EXAMPLE 3 | 54.7 | 19.9 | 24.9 | 0.5 | 915 | 11.1 | 0.050 | 0.02 | Li$_2$ZrO$_3$ | 207.4 | 193.5 | 175.7 |
| EXAMPLE 4 | 54.7 | 19.9 | 24.9 | 0.5 | 915 | 12.2 | 0.054 | 0.02 | Li$_2$ZrO$_3$ | 236.8 | 190.6 | 170.8 |
| COMPARATIVE EXAMPLE 1 | 55.0 | 25.0 | 20.0 | — | 900 | 12.5 | 0.096 | — | — | 166.4 | 192.5 | 173.6 |
| COMPARATIVE EXAMPLE 2 | 70.0 | 15.0 | 15.0 | — | 840 | 13.5 | 0.099 | — | — | 176.6 | 211.0 | 189.8 |
| COMPARATIVE EXAMPLE 3 | 69.2 | 14.9 | 14.9 | 1.0 | 840 | 14.4 | 0.132 | — | — | 176.6 | 209.1 | 188.2 |
| COMPARATIVE EXAMPLE 4 | 68.6 | 14.7 | 14.7 | 2.0 | 840 | 13.6 | 0.133 | — | — | 170.8 | 204.5 | 183.5 |
| COMPARATIVE EXAMPLE 5 | 55.0 | 20.0 | 25.0 | — | 915 | 11.9 | 0.104 | 0.02 | — | 170.0 | 191.7 | 170.3 |

As shown in Table 1, in Examples 1 and 2, it was confirmed that the positive electrode active material with a low amount of excessive lithium was obtained when compared to Comparative Example 1 with the same composition except that Zr was not added. Therefore, according to the positive electrode active material of Examples 1 and 2, it was confirmed that gelation can be inhibited when the positive electrode slurry is used. Incidentally, even when N-methyl-2-pyrrolidone was added to the positive electrode material actually produced using the active material of Examples 1 and 2 to prepare the positive electrode slurry, it was confirmed that gelation did not occur. In addition, in Examples 1 and 2, a different phase of Li$_2$ZrO$_3$ was confirmed, but in Comparative Example 1, a different phase was not confirmed.

The same was confirmed in the comparison of Examples 3 and 4 with Comparative Example 5.

It is presumed that this is because zirconium is dispersed in the primary particles of the lithium nickel manganese complex or a lithium zirconium compound containing lithium is formed and placed on the surface of the primary particles, thereby reducing the excessive lithium.

On the other hand, in Comparative Examples 1 and 2, the amount of excessive lithium was not reduced because no zirconium was added.

In Comparative Examples 3 and 4, although zirconium was added, there was no reduction in the amount of excessive lithium compared with Comparative Examples 2, and it was confirmed that the amount of excessive lithium was increased. Because no phases were identified, this may be due to the lack of zirconium dispersion in the primary particles of lithium nickel manganese complex oxides and the lack of progress in the formation of lithium-zirconium compounds.

As described above, the positive electrode active material for a lithium ion rechargeable battery, the method of manufacturing the positive electrode active material for a lithium ion secondary battery, and the lithium ion secondary battery were described in the embodiments and the examples, but the present invention is not limited to the above-described embodiments and the examples. Various modifications and variations are possible within the scope of the scope of the invention as defined in the claims.

This application claims priority to Japanese Patent Application No. 2018-147170 filed with the Japanese Patent Office on Aug. 3, 2018, and Japanese Patent Application No. 2018-234866 filed with the Japanese Patent Office on Dec. 14, 2018. The entire contents of Japanese Patent Application No. 2018-147170 and Japanese Patent Application No. 2018-234866 are incorporated herein by reference.

The invention claimed is:

1. A positive electrode active material for a lithium ion secondary battery containing lithium nickel manganese complex oxide particles,
    wherein the lithium nickel manganese complex oxide particles are composed of secondary particles formed of aggregated primary particles of a lithium nickel manganese complex oxide represented by a general formula LidNi$_{1-a-b-c}$Mn$_a$M$_b$Zr$_c$O$_{2+\alpha}$ (where M is at least one element selected from Co, W, Mo, Mg, Ca, Al, Ti, Cr, and Ta, and is 0.05≤a<0.60, 0≤b<0.60, 0.00003≤c≤0.03, 0.05≤a+b+c≤0.60, 0.95≤d≤1.20, and −0.2≤α≤0.2),
    wherein at least a portion of zirconium is dispersed in the primary particle, and
    wherein the positive electrode active material for the lithium ion secondary battery contains an amount of excessive lithium obtained by a neutralization titration method is 0.02 mass % or more and 0.09 mass % or less.

2. The positive electrode active material for the lithium ion secondary battery according to claim 1, wherein an amount of residual carbon obtained by ICP emission spectroscopy is 0.01 mass % or more and 0.04 mass % or less.

3. The positive electrode active material for the lithium ion secondary battery according to claim 1, wherein a maximum zirconium concentration in the primary particle is not more than three times an average zirconium concentration in the primary particle.

4. The positive electrode active material for the lithium ion secondary battery according to claim 1, wherein a volume average particle diameter MV of the secondary particles is 4 μm or more and 20 μm or less.

5. A method of manufacturing a positive electrode for a lithium ion secondary battery including lithium nickel manganese oxide complex particles, wherein the lithium nickel manganese complex oxide particles are composed of secondary particles formed of aggregated primary particles of a lithium nickel manganese complex oxide represented by a general formula $Li_dNi_{1-a-b-c}Mn_aM_bZr_cO_{2+\alpha}$ (where M is at least one element selected from Co, W, Mo, Mg, Ca, Al, Ti, Cr, and Ta, and is $0.05 \leq a < 0.60$, $0 \leq b < 0.60$, $0.00003 \leq c \leq 0.03$, $0.05 \leq a+b+c \leq 0.60$, $0.95 \leq d \leq 1.20$, and $-0.2 \leq \alpha \leq 0.2$), and wherein at least a portion of zirconium is dispersed in the primary particle, comprising:
- a step of obtaining a lithium zirconium mixture of nickel manganese complex hydroxide particles represented by a general formula $Ni_{1-x-y}Mn_xM'_y(OH)_{2+\beta}$ (where M' is at least one element selected from Co, W, Mo, Mg, Ca, Al, Ti, Cr, Zr, and Ta, and is $0.05 \leq x \leq 0.60$, $0 \leq y \leq 0.60$, $0.05 \leq x+y \leq 0.60$, and $-0.1 \leq \beta \leq 0.4$), a zirconium compound, and a lithium compound; and
- a step of firing a lithium nickel manganese complex oxide by firing the lithium zirconium mixture at a temperature between 850° C. and 1000° C. in an oxidizing atmosphere,
- wherein the positive electrode active material for the lithium ion secondary battery contains an amount of excessive lithium obtained by a neutralization titration method is 0.02 mass % or more and 0.09 mass % or less.

6. The method of manufacturing the positive electrode active material for the lithium ion secondary battery according to claim 5, wherein the positive electrode active material for the lithium ion secondary battery has a residual carbon amount obtained by ICP emission spectroscopy of 0.01 mass % or more and 0.04 mass % or less.

7. The method of manufacturing the positive electrode active material for the lithium ion secondary battery according to claim 5, further comprising:
- a step of crystallizing the nickel manganese complex hydroxide particles by adding an alkaline aqueous solution to a mixed aqueous solution containing at least nickel and manganese.

8. The method of manufacturing the positive electrode active material for the lithium ion secondary battery as claimed in claim 5,
- wherein an average particle diameter of the zirconium compound is not less than 0.01 μm and not more than 10 μm, and
- wherein the zirconium compound is one or more kinds selected from zirconium hydroxide and zirconium oxide.

9. The method of manufacturing the positive electrode active material for the lithium ion secondary battery according to claim 5, further comprising:
- a step of heat treating the nickel manganese complex hydroxide particles at a temperature of 105° C. or more and 700° C. or less prior to the mixing step.

10. A lithium ion secondary battery including a positive electrode including a positive electrode active material for a lithium ion secondary battery according to claim 1.

* * * * *